United States Patent
Anderson et al.

(10) Patent No.: US 8,561,199 B2
(45) Date of Patent: Oct. 15, 2013

(54) METHOD AND SYSTEM FOR SECURE LIGHTWEIGHT STREAM PROCESSING

(75) Inventors: Kay Schwendimann Anderson, Washington, DC (US); Joseph Phillip Bigus, Rochester, MN (US); Eric Bouillet, Englewood, NJ (US); Parijat Dube, Yorktown Heights, NY (US); Mark David Feblowitz, Winchester, MA (US); David Alson George, Somers, NY (US); Nagui Halim, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1497 days.

(21) Appl. No.: 11/622,203

(22) Filed: Jan. 11, 2007

(65) Prior Publication Data

US 2009/0271874 A1 Oct. 29, 2009

(51) Int. Cl.
*H04L 29/06* (2006.01)

(52) U.S. Cl.
USPC .................. 726/26; 726/2; 726/27; 713/160

(58) Field of Classification Search
USPC .............................. 726/13, 26; 713/163, 160
See application file for complete search history.

(56) References Cited

U.S. PATENT DOCUMENTS

| | | | |
|---|---|---|---|
| 5,410,694 A | 4/1995 | Uchida et al. | |
| 5,758,086 A | 5/1998 | Maegawa | |
| 5,815,707 A | 9/1998 | Krause et al. | |
| 5,907,678 A * | 5/1999 | Housel et al. | 709/213 |
| 6,405,255 B1 | 6/2002 | Stoltz et al. | |
| 6,631,484 B1 * | 10/2003 | Born | 710/305 |
| 6,650,640 B1 * | 11/2003 | Muller et al. | 370/392 |
| 6,691,175 B1 | 2/2004 | Lodrige et al. | |
| 7,209,448 B2 * | 4/2007 | Oskouy et al. | 370/238 |
| 7,376,134 B2 * | 5/2008 | Carter et al. | 370/389 |
| 7,587,587 B2 * | 9/2009 | Buer et al. | 713/153 |
| 8,068,499 B2 * | 11/2011 | Vidya et al. | 370/395.5 |
| 8,230,098 B2 * | 7/2012 | Chen et al. | 709/231 |
| 2002/0133491 A1 * | 9/2002 | Sim et al. | 707/10 |
| 2003/0204602 A1 * | 10/2003 | Hudson et al. | 709/228 |
| 2005/0256967 A1 * | 11/2005 | Winter | 709/231 |
| 2008/0026777 A1 * | 1/2008 | van der Gaast et al. | 455/466 |
| 2008/0162922 A1 * | 7/2008 | Swartz | 713/150 |

OTHER PUBLICATIONS

Badrinath et al., "Data on Air: Organization and Access" IEEE, vol. 9, No. 3, May/Jun. 1997.*

* cited by examiner

*Primary Examiner* — Mohammad L Rahman
(74) *Attorney, Agent, or Firm* — Tutunjian & Bitetto, P.C.; William J. Stock (57) ABSTRACT

A system and method for processing an information unit/packet (IU) in a stream processing system includes decomposing an IU into sub-information units persisted other than in the IU. An index or reference is generated in the IU for retrieving the persisted sub-information units during processing.

18 Claims, 6 Drawing Sheets

METHOD AND SYSTEM FOR SECURE LIGHTWEIGHT STREAM PROCESSING

GOVERNMENT RIGHTS

This invention was made with Government support under Contract No.: H98230-04-3-0001 awarded by the U.S. Department of Defense. The Government has certain rights in this invention.

BACKGROUND

1. Technical Field

The present invention relates to stream processing and more particularly to a system and method for designing a secure and lightweight stream processing system (SPS).

2. Description of the Related Art

A stream processing system (SPS) normally includes a network(s) of thousands of processing units (PUs) and the packets/information units (IUs) that flow between them. A processing unit (PU) normally includes an input port, analytics and an output port. The input port acts as the receiver of IUs from upstream PU(s) and the output port acts as a sender of IUs to downstream PU(s). The PU typically processes the input IU and extracts some additional information or attributes from the IU through its analytics. Analytics is a generic term for algorithms, transformation techniques or logical operations employed by the PU to process the IU before forwarding it downstream.

An IU typically carries two fields of information: payload and derived information. Payload is the basic information generated from the source of the stream, which may include segments of images, video, audio, speech transcript files, etc. Payload can be in binary and/or coded format. Derived information is meta-data derived from the payload of IUs. Derived information can be added before the IU enters the SPS through automated pre-processing or through manual techniques etc.

Alternatively, the derived information field may be progressively enriched by the PUs as the IU traverses through the SPS. The derived information mainly includes tuples of the form <attribute name, attribute value>.

Though the IU carrying the derived information and payload flows through the SFS, not all the PUs encountered by the IU in its path are interested in each and every piece of information carried by the IU. Some PUs may be interested in processing only the derived information while others are interested in only the payload and do not care about the derived information carried by the IU. Among the PUs interested in only the derived information, different PUs may access different subsets of the derived information. This may be because either the PUs do not need information carried by other fields of the derived information, or they do not have permission to access other fields due to security and privacy considerations.

A naïve solution is to have access control labels to different fields of information carried by an IU. Thus when the IU arrives at a PU, security and privacy (S&P) checks are done locally at the PU and only those fields of the IU to which the PU has access rights are disclosed to the PU. The PU then processes the IU and may add more derived information to the IU.

The disadvantages of such a solution include: 1) The PU is more vulnerable to hacking as a single compromised PU can negatively affect the performance of all the downstream PUs; 2) Having S&P labels for different fields inflates the size of the IU and thus can contribute to congestion in the SPS; and 3) Since each PU may further add more derived information to the IU, the size of IU progressively expands along its path in the SPS further contributing to congestion in the resource constrained environment in which most SPS typically operate.

Figure 1:
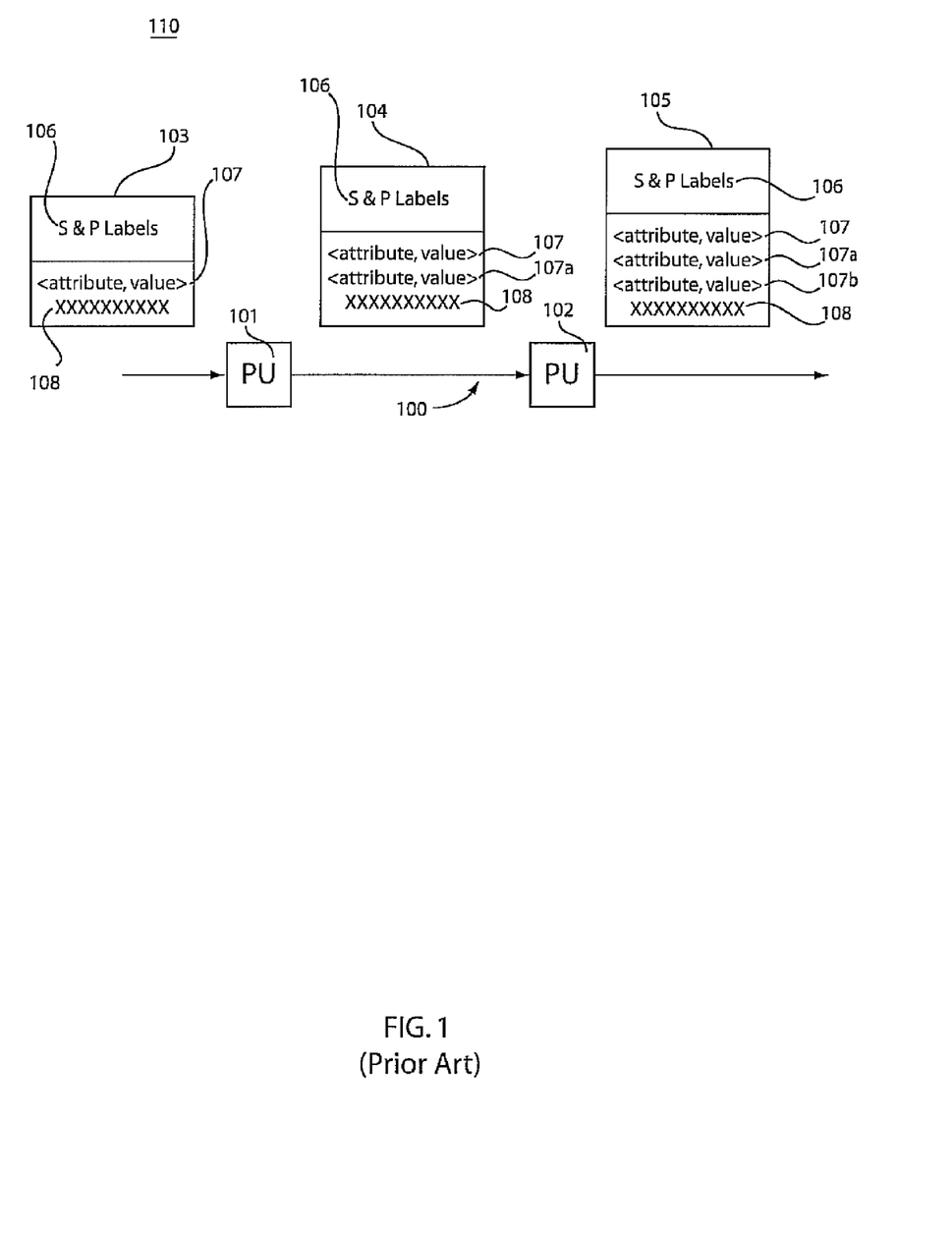
FIG. 1 is a block diagram showing a conventional solution where security and privacy labels are maintained in an information unit/packet (IU) for all fields in the IU.

Referring to FIG. 1, such a naïve solution is illustratively depicted in which security and privacy (S&P) labels 106 are embedded in IUs 103, 104 and 105. The S&P labels provide information for access controls to the derived information and payload or to portions thereof. S&P checks are performed at each PU 101 and 102 which the IU encounters in its path 100 in the SPS 110. The SPS 110 includes PU 101 and PU 102 and flow path 100.

The IU 103 initially includes S&P labels 106, derived information including a single <attribute name, attribute value> tuple 107 and payload 108. When IU 103 reaches PU 101, PU 101 does S&P checks, processes the information fields (in this case either the derived information or payload or both) to which it has access, and writes a new tuple 107a in the derived information field. The modified IU 104 leaving PU 101 is greater in size than IU 103. Similarly, PU 102, after processing PU 101, adds more meta-data 107b. The size of original IU 103 gets progressively expanded as it leaves PU 101 and PU 102 to become modified IU 105.

SUMMARY

In accordance with present principles, it would be preferable to provide a way to send information fields to only those PUs interested in the information and/or for which the PUs have access rights. It is therefore desirable to shed undesired/restricted information from IUs to reach the PUs among other things.

A system and method for processing an information unit/packet (IU) in a stream processing system includes decomposing an IU into sub-information units persisted other than in the IU. An index or reference is generated in the IU for retrieving the persisted sub-information units during processing.

These and other features and advantages will become apparent from the following detailed description of illustrative embodiments thereof, which is to be read in connection with the accompanying drawings.

BRIEF DESCRIPTION OF DRAWINGS

This disclosure will provide details in the following description of preferred embodiments with reference to the following figures wherein.

DETAILED DESCRIPTION OF PREFERRED EMBODIMENTS

Stream processing systems (SPS) normally include a network or networks of thousands of processing units (PUs) and the packets/information units (IUs). SPSs are employed in many applications involving real-time stream mining for query processing. Examples include business analytics, search engines, classification systems, feedback control systems, process control systems, etc. SPSs may be implemented in hardware and/or software in a plurality of different devices or systems that process streams. Embodiments as described here may be employed in business analytics, search engines, classification systems, feedback control systems, process control systems, and other applications.

Embodiments in accordance with the present principles break a whole or parts of an IU into smaller information units. For example, an IU with security and privacy (S&P) labels, attributes and payload can be decomposed into three sub-information units, e.g., one for S&P labels, one for attributes, and one for payload. There can be other ways of grouping different fields of the IU into sub-information units as well. The sub-information units are persisted elsewhere along with their S&P labels and only references or indexes are sent to the locations where the sub-information units pertaining to different fields of the IU are persisted.

Whenever an IU is received by a PU for which the PU is interested in processing, the PU fetches information about different fields using the references in the IU from the storage location(s) where this information is persisted, and possibly updates the information at these locations (as a result of its own processing). In this way, only selective information need be accessed by the PU, and the IU need not carry a large payload or large amounts of derived information (meta-data).

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 2:
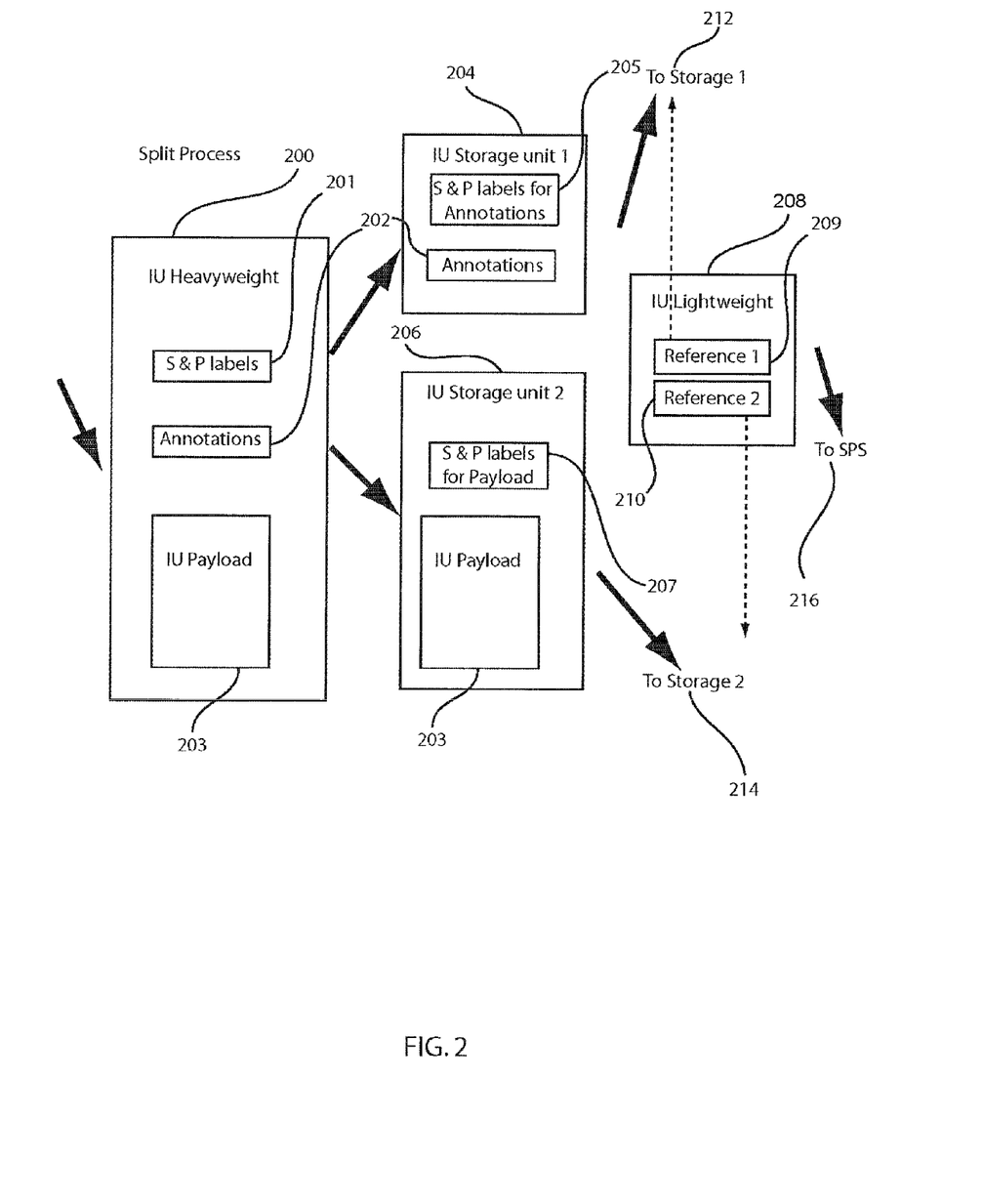
FIG. 2 is a block diagram showing a system/method for decomposing or splitting an IU in accordance with one embodiment.

Referring now to the drawings in which like numerals represent the same or similar elements and initially to FIG. 2, in accordance with one illustrative embodiment, an information unit (IU) 200 (heavyweight) is decomposed on the basis of attributes or derived information and payload. An attributes storage unit 204 and payload storage unit 206 and their corresponding S&P labels 205 and 207 are stripped from the IU 200 and persisted at some storage locations 212 and 214. A modified IU 208 (lightweight) now has only references 209 and 210 to the locations where the attributes and payload and their corresponding S&P labels are persisted (e.g., storage 212 and storage 214). The storage location(s) 212 and 214 may be a repository or an independent stream that is persisted for as long as the data in the stored information unit 208 is needed by a stream processing system 216.

FIG. 2 shows one possible illustrative decomposition of an IU 200 into two sub-information units 204 and 206. The sub-information units in this example include attributes information or annotations 202 and the other includes payload information 203. The heavyweight IU 200 includes S&P labels for annotations (also called attributes or derived information fields) and payload 201, annotations, 202, and payload, 203.

After the splitting operation, the sub-information unit 204 (IU Storage unit 1 204) includes S&P labels for annotations only 205 and annotations 202. The sub-information unit 206 (IU Storage unit 2 206) includes S&P labels for payload only 207 and payload 203. Storage units 204 and 206 are persisted at different storage locations, storage 1 212 and storage 2 214. The stripped IU 208 that is now sent in the SPS 216 is very lightweight including only references to storage locations of annotations and payload, namely Reference 1 209 points to a storage location of IU Storage unit 1 204 in storage 1 212 and Reference 2 210 points to a storage location of IU Storage unit 2 206 in storage 2 214. During processing in the SPS, a PU simply retrieves the information persisted elsewhere in accordance with the references 209 and 210 when processing the IU, and preferably only when the PU needs the information includes therein.

In one embodiment, a naming system or index generator assigns a unique ID or IUid to each "alive" IU, and a unique ID or PUid to each "alive" PU. An IU is "alive" when it is still needed by the SPS and is not thrown away. A PU is preferably a software entity and is instantiated in run-time. A PU is "alive" if it is up and running. For purposes of discussion, reference to an IU or a PU implicitly means that "alive" IU and PUs are being described. Then, an IU can be as simple as carrying only its unique IUid and no other information. Whenever an IU arrives at a PU, the PU can query the storage locations (assuming the PUs are aware of their locations by some global directory) by sending the IUid and PUid. This unique combination of Iuid and PUid will be used by the storage locations to grant access to the field to which a PU is entitled to and is interested in.

The S&P checks are now preferably performed at the storage locations 212 and 214 instead of locally at the PUs. Each PU, after it processes the fields of the IU 208, can update the fields (add more information, etc.) of the sub-information units in the corresponding storage locations instead of writing in the IU directly as in the traditional solution. Thus, the size of IU remains almost the same and the IU does not get bloated while traversing its path in the SPS 216.

Figure 3:
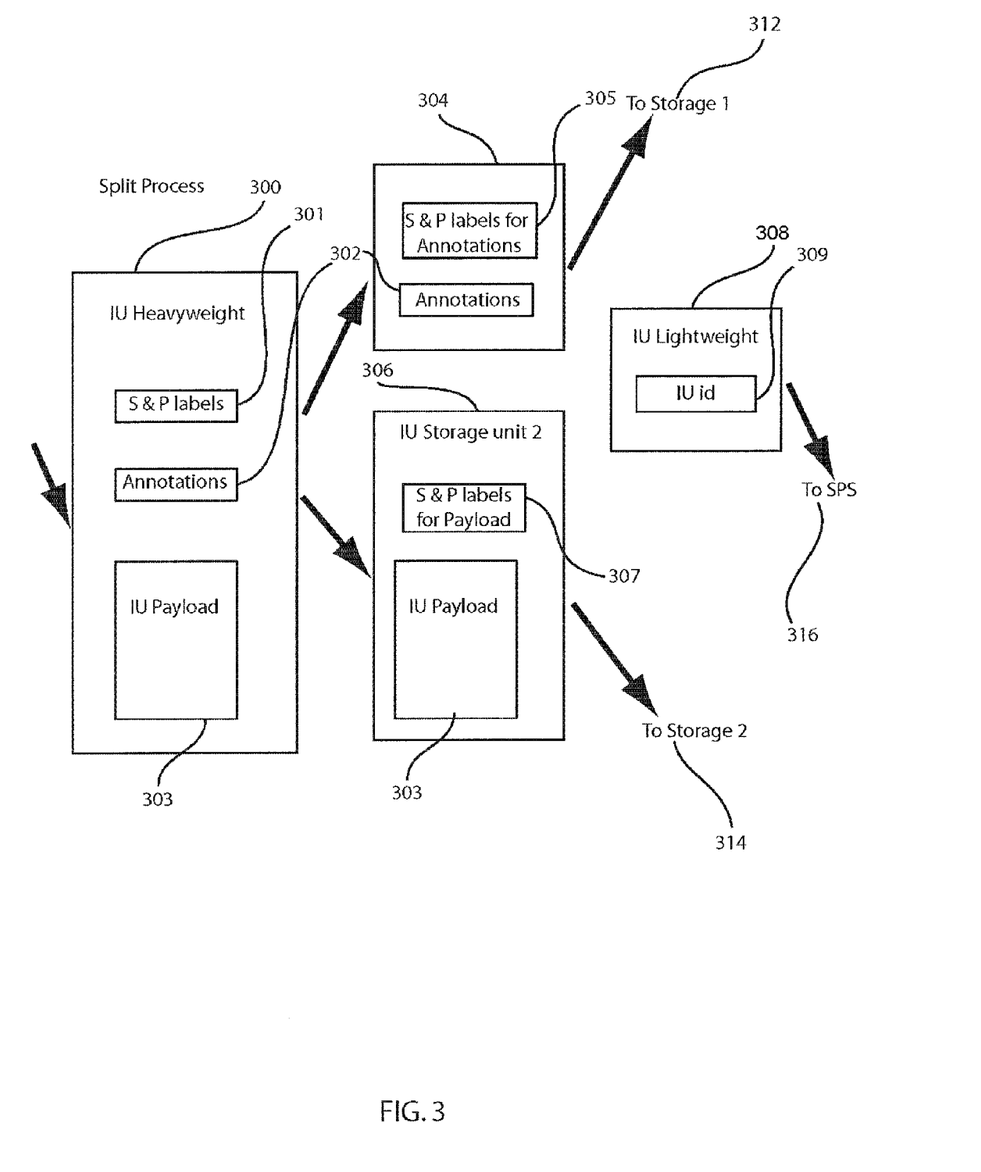
FIG. 3 is a block diagram showing a system/method for decomposing or splitting an IU in accordance with another embodiment.

Referring to FIG. 3, an illustrative embodiment is depicted where a unique global id is assigned to each IU and to each PU. FIG. 3 is similar to FIG. 2 except that a modified IU 308 has a single field carrying an IUid 309 instead of pointers (209 and 210 in FIG. 2), as an IU 308 is uniquely identified by its id.

An IU 300 is decomposed into two sub-information units, one sub information unit (to storage unit 1) 304 includes attributes 302 and their corresponding S&P labels 305 (from 301) and the other sub-information unit (storage unit 2) 306 includes payload 303 and S&P labels 307 (from 301). These two sub-information units 304 and 306 are persisted at two separate storage locations storage 1 (e.g., in L1 cache) 312 for (attributes+S&P labels) and storage 2 (e.g., in L2 cache) 314 for (payload+S&P labels) for each IU 300, with their locations hashed by the IUid 309. The lightweight IU 308 only carries the IUid 309.

Whenever a PU receives an IU 308, it first queries storage 1 312, with its own PUid, its S&P labels 305 and the IUid 309. On receiving the PU request, storage 1 312 looks for the attributes associated with IUid 309, and using a PUid and S&P labels of the PUid and of the IUid 309, replies back to PU with the <attribute name, attribute value> pairs of the attributes which the PU is entitled to access. The PU can further filter the information it is receiving from storage 1 312 by reading only those pairs which the PU needs for its analytics. Though a PU may have privileges to access many different attributes (e.g., when the PUs are classified into various groups with access control for attributes defined at a group level and not at an individual PU level). However, for the PUs particular analytics, the PU may only need a subset of those attributes. If the PU needs to run analytics on the payload to get additional attributes, the PU will request storage 2 314 with its PUid, its S&P labels and the IUid 309.

The PU may update information about old attributes and/or add new attributes it has discovered (after its own processing) by writing to storage 1 312 and then forwarding the packet to a downstream PU.

Figure 4:
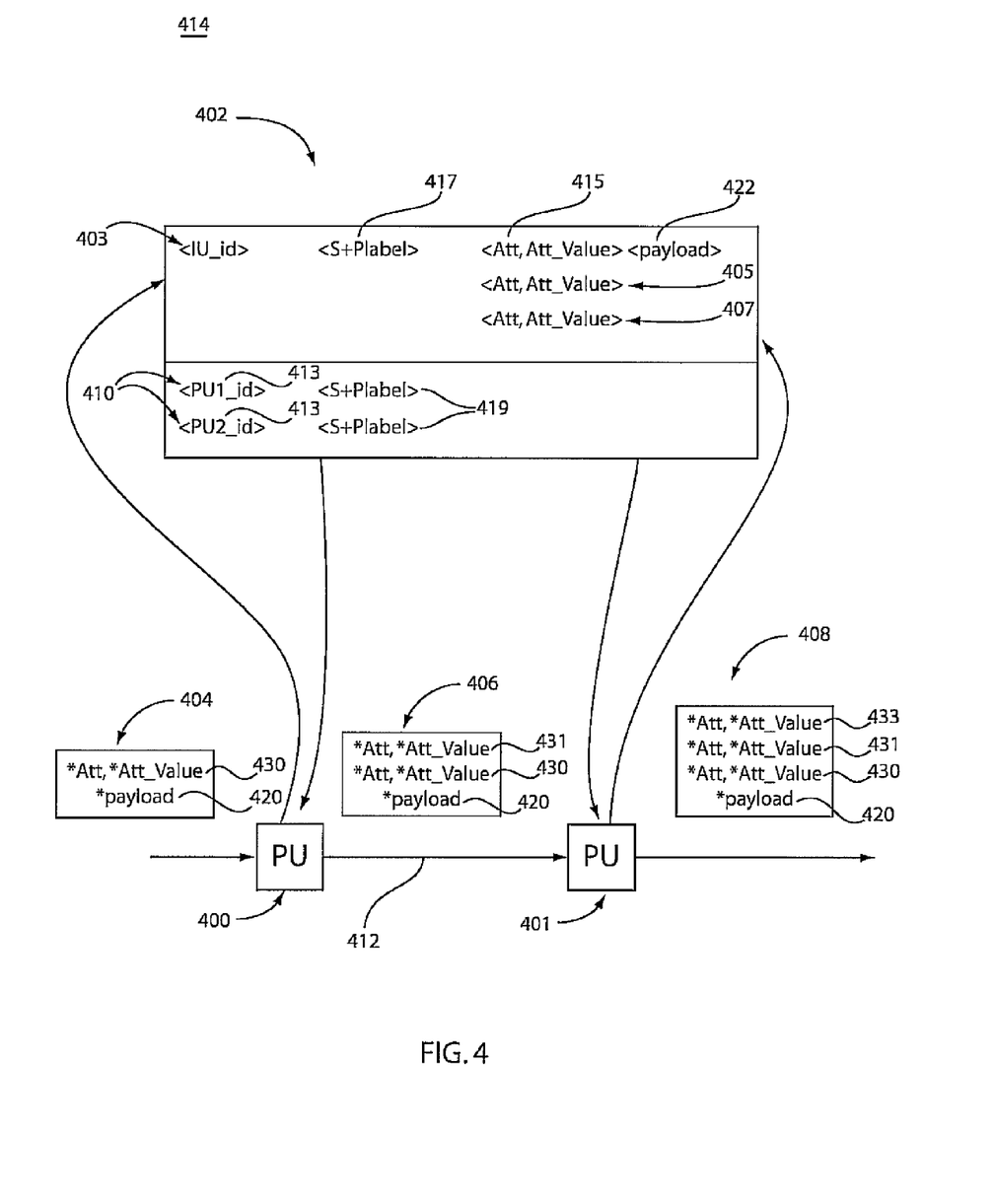
FIG. 4 is a block diagram showing a system/method for creating and employing lightweight IUs with a repository for a stream processing system (SPS) in accordance with an illustrative embodiment.

Referring to FIG. 4, another embodiment illustratively assigns a unique global id to each PU, but the IUs are not assigned any ids. As opposed to the embodiment described with reference to FIG. 3, a single storage location, a repository 402, is maintained for information persistence. The repository 402 maintains data corresponding to each IU. The data for the IU includes the S&P labels 417 for the IU fields, <attribute name, attribute value> 415 and <payload> 422. The repository 402 also includes an entry 410 for each PU, including the PUid 413 and S&P labels 419 for the access rights of the PU.

In the IU 404, only pointers 420 and 430 are sent. The pointers correspond to storage locations in repository 402 for <attribute name, attribute value> pairs 430 and for the payload 420. Alternatively, if there is a link from attributes data (e.g., 415) to payload (422) in repository 402 then only pointers of attributes data are sent (no payload pointer 420 would be needed).

When a PU 400 (401) receives an IU 404 (406), the PU 400 (or 401) sends a PUid and pointers 430 and/or 420 (430 and/or 431 and/or 420) received from the IU 404 (406) to repository 402. Since these pointers correspond to unique locations in the repository 402, the IU 404 (406) is identified, and using the S&P labels 417 of the IU and S&P labels 419 of the PU, the access rights of the PU are determined for the corresponding attributes.

Advantageously, the security and privacy checks for accessing the attributes of a packet (IU) are performed at storage locations thus reducing system vulnerability. Since if S&P checks are done at a PU locally then a single compromised PU can bring down the whole stream processing system.

The repository 402 replies back to the PU 400 (401) with the <attribute name, attribute value> pairs 405 and/or 407 and/or 415 of the attributes which the PU is entitled to access and/or the payload 422 if the PU has right to access the payload corresponding to this IU. The repository 402 can also provide some static information about the IU which is not modifiable by any PU and which repository 402 persists during the lifetime of the IU. The PU can further filter the information it is receiving from repository 402 by reading only those pairs which it needs for its analytics.

The PU (400, 401) may update information about old attributes and/or add new attributes it has discovered (after its own processing) by writing to repository 402. For new attributes, repository 402 can send back pointers to storage locations to the PU. The PU then adds pointers to new attributes in the IU and forwards IU packet to downstream PUs. Scalability and performance may be improved by using appropriate temporary storage mechanisms for storing IU data. Such temporary storage mechanisms may include, e.g., queuing delay lines, cached storage (including electronic, magnetic, and other modalities).

FIG. 4 provides a step-by-step illustration of one illustrative embodiment. In this embodiment, SPS 414 includes two PUs, PU 400 and PU 401. Storage repository 402 maintains information about IUs (404, 406 and/or 408) throughout the SPS 414 and maintains information about PUs 400, 401. Initially, repository 402 has information 403 about S&P labels, <attribute name, attribute value> pairs, and payload corresponding to an IU, and information 410 about the S&P labels corresponding to each PU. The information about PUs is indexed, e.g., by an associated global unique id (413).

A lightweight IU 404 includes pointers 430 and 420, respectively to <attribute name, attribute value> pairs 415 and payload 422. After processing IU 404, PU 400 adds a new <attribute name, attribute value> pair 405 at repository 402 and also adds pointers 431 corresponding to a location of pair 405. The IU 406 leaves PU 400 and has additional pointers 431 (and perhaps others). This IU 406 is again processed by PU 401, which after processing, similarly adds a new <attribute name, attribute value> pair 407 in repository 402 and also adds pointers 433 to IU 406 and the IU leaving PU 401 becomes IU 408 with additional pointers for new attributes discovered by PU 401.

In accordance with present principles, aspects of the present embodiments include: 1) reduced size of information units flowing through an SPS; 2) reduced message queuing at PUs; 3) improved scalability; 4) enforced privacy of information; and 5) enhanced security of PUs. Other advantages and benefits are also realized by the present embodiments.

Figure 5:
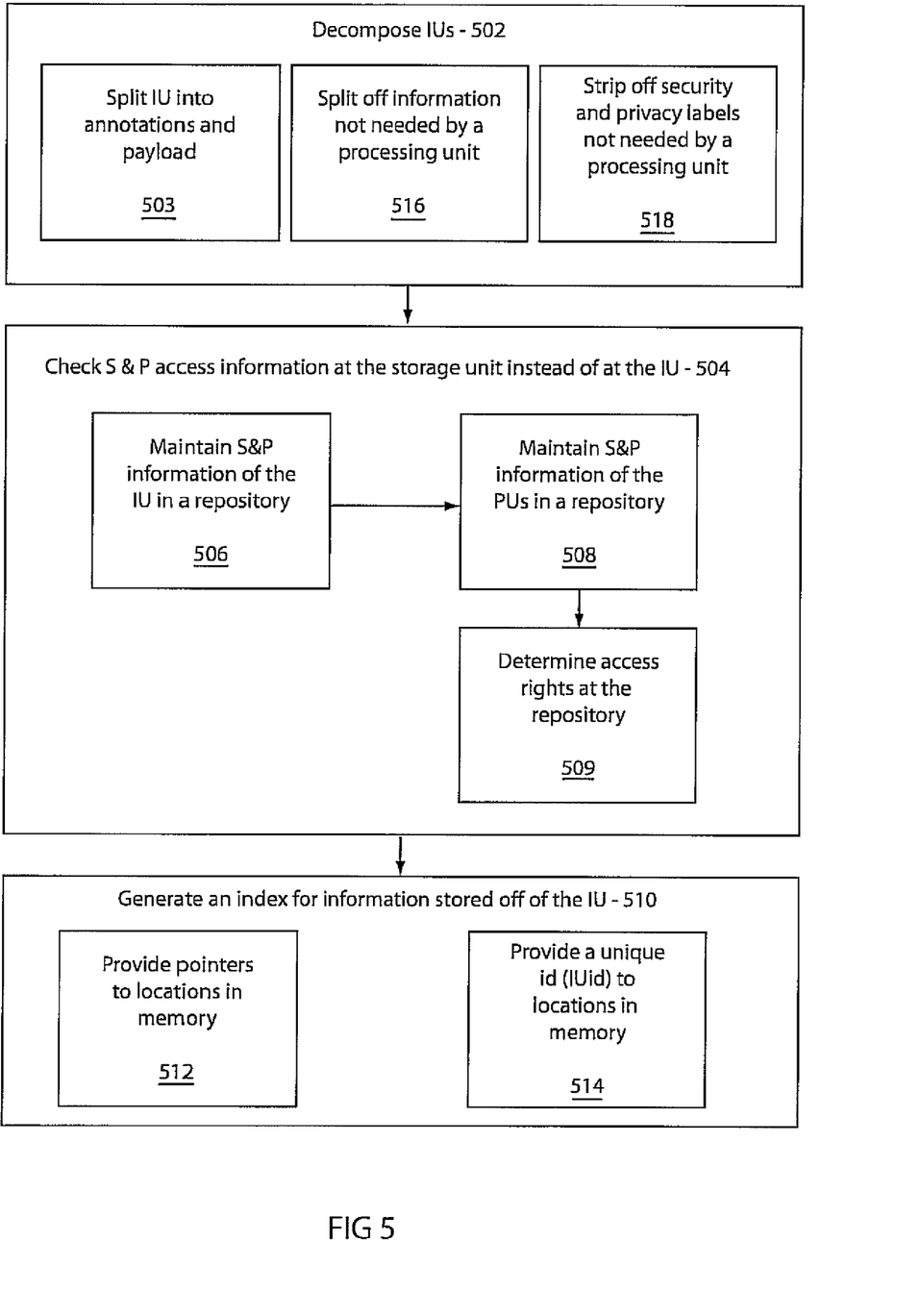
FIG. 5 is a block/flow diagram showing a system/method for processing IUs in accordance with the present principles.

Referring to FIG. 5, a system/method for processing an information unit/packet (IU) in a stream processing system is illustratively depicted. In block 502, an IU or IUs transported in a stream is/are decomposed into sub-information units persisted other than in the IU. In one embodiment, the decomposition may include splitting the IU into annotations (derived information or meta-data) and payload in block 503. The annotations may include, e.g., security and privacy labels or other information. The payload may include, e.g., any data or packet related to the application for which the stream is employed. If the annotations include security and privacy labels, in block 504, security and privacy access information is optionally checked at a location other than at the IU, e.g., in a repository or other storage element or unit.

If the sub-information units are persisted in a repository, security and privacy information may be maintained for IUs in the repository in block 506, and, in addition, security and privacy information associated with each of a plurality of processing units may be maintained in block 508 in the repository such that when an IU reaches a processing unit a determination of access to IU content is determined in the repository in block 509. In this optional feature, security is enhanced since security processing is taken away from the IUs in the data stream. The decomposing and splitting process may be performed prior to or during processing by the SPS.

In block 510, an index is generated in the IU for retrieving the persisted sub-information units during processing. Generating an index in the IU may include providing pointers to memory storage locations in block 512 or providing a unique IU address in memory storage in block 514 to permit retrieval by a processing unit of the IU information from the storage unit using the pointers or the unique id in the IU being considered by the processing unit.

Another optional feature includes reducing congestion in a stream processing system by splitting off information not needed by a processing unit in block 516. If information, say for example, payload, is not needed for analytics of a processing unit, the IU may have the payload split off from the IU during the decomposition process (block 502). This feature is particularly useful when a repository is employed since it can be known in advance what type of PU is being employed and what the PU needs in the way of information from the IU. The information not needed by the processing unit may include one or more of attribute names, attribute values, payload, etc.

In one embodiment, security is enhanced by stripping away security and privacy labels in block 518 in the decomposing process (of block 502) from an IU and storing the labels other than on the IU, for example, in a repository.

Figure 6:
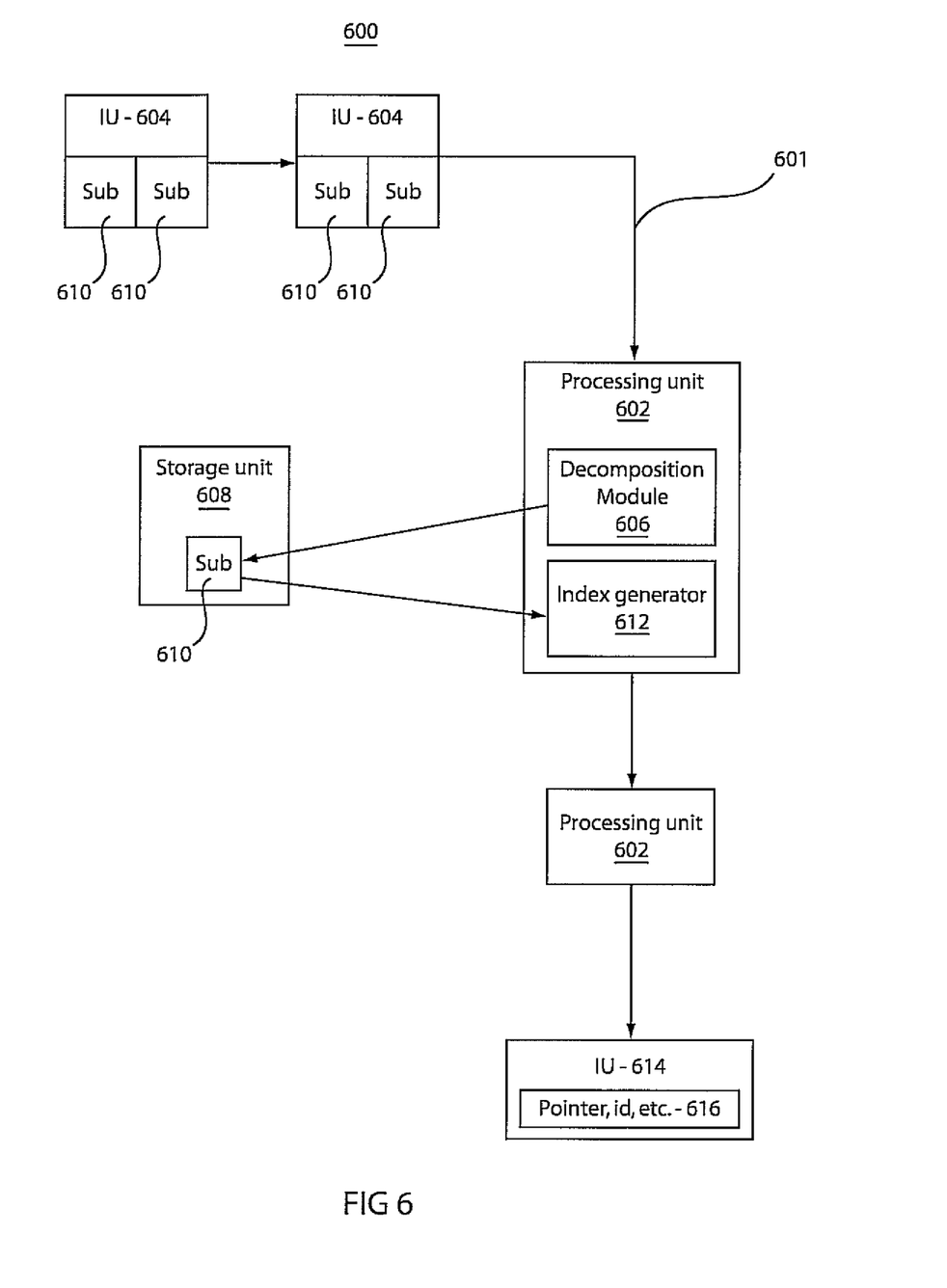
FIG. 6 is a block diagram showing a system for processing IUs in a stream in accordance with the present principles.

Referring to FIG. 6, a stream processing system (SPS) 600 is depicted in accordance with one illustrative embodiment for processing a stream 601 of information units/packets (IUs) 604. SPS 600 may be included in a network (server(s) or node(s)) or on any device such as a personal computer, handheld computer device, cellular telephone, or any other device that processes streams. At least one processing unit (PU) 602 is configured to receive information units/packet (IUs) 604. A decomposing module 606 is configured to receive and decompose IUs 604 into sub-information units 610 persisted in a storage unit 608, the storage unit being other than in the IU. The decomposing module 606 may be integrated into one or more of the processing units 602 in the SPS 600 or be a stand-alone module or processing device which may be employed to process an incoming stream of IUs 604. The sub-information units 612 may include annotations, such as e.g., S&P labels, payload, other information components, etc. In one embodiment, the decomposition module 606 reduces congestion in the stream processing system by splitting off information not needed by the at least one processing unit. The information not needed by the processing unit may include one or more of attribute names, attribute values, other labels, payload, etc. The decomposition module 606 may further enhance security by stripping away security and privacy labels from an IU and storing the labels in the storage unit 608.

An index generator or assignor 612 is configured to assign a location of the sub-information units 610 or component parts of the IUs in the storage unit 608 and provide information about the location to the IU for retrieving the persisted sub-information units during processing by the at least one processing unit 602. The index generator 612 may be integrated into one or more of the processing units 602 in the SPS 600 or be a stand-alone module or processing device. The index generator 612 may provide information about the location in the storage unit 608 in the form of pointers, a unique IU identity or other retrieval mechanisms 616. The index is stored in the IUs and the IU becomes a lightweight IU 614 as a result of no longer maintaining a large amount of information.

In one embodiment, the storage unit 608 includes a repository, and security and privacy information is maintained for IUs and the at least one processing unit such that when an IU reaches the at least one processing unit a determination of access to IU content is determined in the repository as opposed to the location of the IU for security considerations. The storage unit 608 may include any memory storage device or a temporary storage mechanism, such as, e.g., a queuing delay line, a cached storage or any other suitable mechanism.

Having described preferred embodiments of a system and method for secure lightweight stream processing (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for processing an information unit/packet (IU) in a data stream processing system, comprising:
    enhancing security by removing one or more sub-information units from an IU, wherein said sub-information units include security and privacy labels, such that said security and privacy labels are persisted other than in the IU; and
    generating an index that is stored in the IU with a processor for retrieving the persisted sub information units during processing,
    wherein the index is added to the IU to allow for subsequent retrieval of the persisted sub-information units.

2. The method as recited in claim 1, wherein removing includes splitting the IU into annotations and payload.

3. The method as recited in claim 2, wherein the annotations include security and privacy labels, and further comprising checking security and privacy access information at a location other than at the IU.

4. The method as recited in claim 1, wherein generating an index in the IU includes providing pointers to memory storage to permit retrieval by a processing unit.

5. The method as recited in claim 1, wherein generating an index in the IU includes providing a unique IU address or hash in memory storage to permit retrieval by a processing unit.

6. The method as recited in claim 1, wherein the sub-information units are persisted in a repository and the method further comprises:
    maintaining security and privacy information for IUs in the repository; and
    maintaining security and privacy information associated with each of a plurality of processing units in the repository such that when an IU reaches a processing unit a determination of access to IU content is determined in the repository.

7. The method as recited in claim 1, further comprising reducing congestion in a stream processing system by splitting off information not needed by a processing unit.

8. The method as recited in claim 7, wherein the information not needed by the processing unit includes one or more of attribute names, attribute values and payload.

9. A computer program product for processing an information unit/packet (IU) in a stream processing system comprising a non-transitory computer useable storage medium including a computer readable program, wherein the computer readable program performs the steps of:

enhancing security by removing one or more sub-information units from an IU, wherein said sub-information units include security and privacy labels, such that said security and privacy labels are persisted other than in the IU; and generating an index that is stored in the IU for retrieving the persisted sub information units during processing, wherein the index is added to the IU to allow for subsequent retrieval of the persisted sub-information units.

10. A stream processing system, comprising:

at least one processing unit (PU) configured to receive information units/packet (IUs);

a decomposing module configured to receive IUs and enhance security by removing security and privacy labels from the IUs, such that said security and privacy labels are persisted in a storage unit, the storage unit being other than in the IU; and an index generator configured to use a processor to assign a location of the sub-information units in the storage unit and provide information about the location to the IU for retrieving the persisted sub-information units during processing by the at least one processing unit, wherein the index generator stores an index comprising said information in the IU to allow for subsequent retrieval of the persisted sub-information units.

11. The system as recited in claim 10, wherein the sub-information units include annotations and payload.

12. The system as recited in claim 11, wherein the annotations include security and privacy labels stored in the storage unit.

13. The system as recited in claim 10, wherein the information about the location includes one of pointers and a unique IU identity.

14. The system as recited in claim 10, wherein the storage unit includes a repository and security and privacy information is maintained for IUs and the at least one processing unit such that when an IU reaches the at least one processing unit a determination of access to IU content is determined in the repository.

15. The system as recited in claim 10, wherein the decomposition module reduces congestion in the stream processing system by splitting off information not needed by the at least one processing unit.

16. The system as recited in claim 15, wherein the information not needed by the processing unit includes one or more of attribute names, attribute values and payload.

17. The system as recited in claim 10, wherein the storage unit includes a temporary storage mechanism including one of a queuing delay line and a cached storage.

18. The system as recited in claim 10, wherein the decomposing module and the index generator are integrated with the at least one processing unit (PU).

* * * * *